March 10, 1959
O. E. NELSON
2,876,790
VALVE CONSTRUCTION
Filed May 11, 1955
3 Sheets-Sheet 1
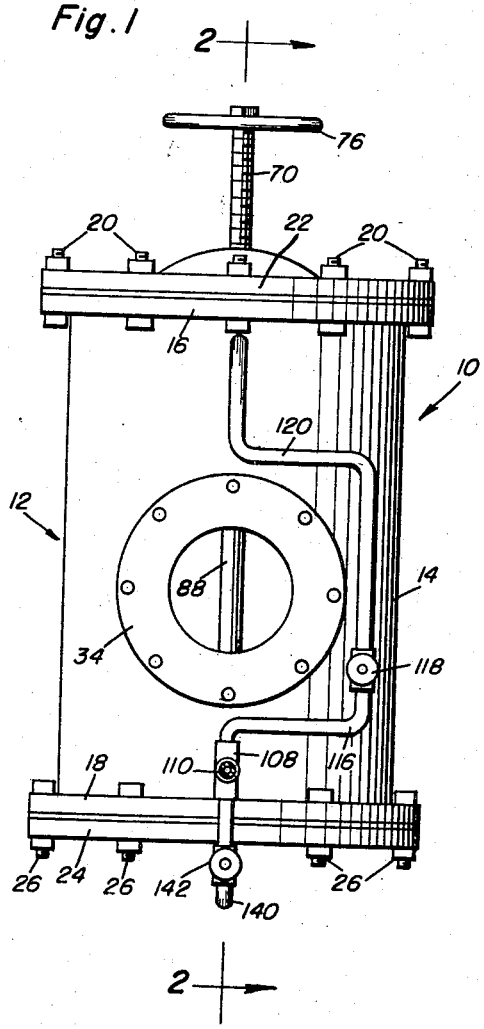
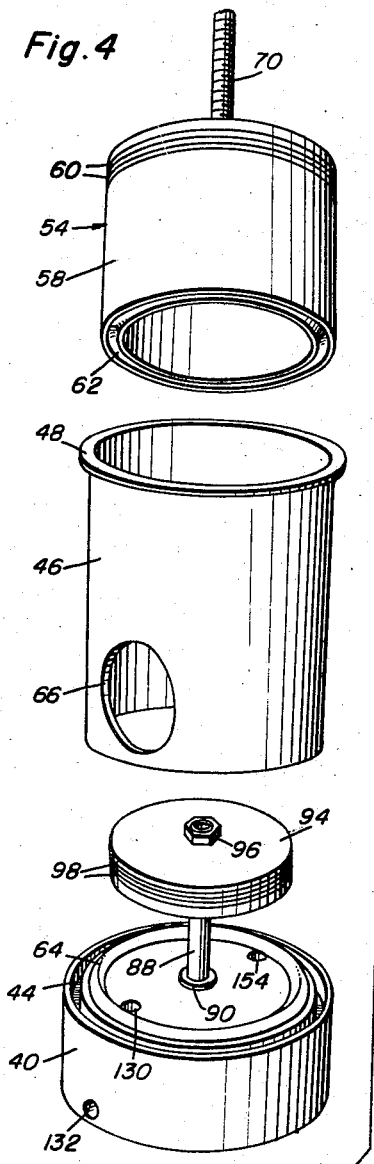
Orval E. Nelson
INVENTOR.
BY *Clarence A. O'Brien*
and *Harvey B. Jacobson*
Attorneys March 10, 1959

O. E. NELSON 2,876,790

VALVE CONSTRUCTION

Filed May 11, 1955

Orval E. Nelson
INVENTOR.

United States Patent Office 2,876,790
Patented Mar. 10, 1959

2,876,790

VALVE CONSTRUCTION

Orval E. Nelson, Highlands, Tex., assignor of one-fourth to Donald R. Lang, Highlands, Tex.

Application May 11, 1955, Serial No. 507,590

6 Claims. (Cl. 137—238)

This invention relates in general to new and useful improvements in valve construction, and more specifically to a valve which is particularly intended for use with respect to fluid lines intended to convey acids, gases and alkalis which may be of a corrosive nature.

In valves utilized in lines for conveying harmful materials, such as acids, gases and alkalis, when the valves are moved to closed positions, there still remain within the valves certain of these harmful fluids which will attack the mechanism of the valve. It is therefore the primary object of this invention to provide an improved valve construction which is of such a nature whereby the mechanism thereof may be cleansed at such time as the valve is in a closed position.

Another object of this invention is to provide an improved valve construction which is provided with a pressurized fluid source for the purpose of cleaning the interior of the valve when the valve member thereof is in a closed position, the fluid pressure also being relied upon for actuating the valve.

Still another object of this invention is to provide an improved valve construction whereby a major portion of the valve member is sealed with respect to the main fluid passage through the valve when the valve member is in an open position.

A further object of this invention is to provide an improved valve member for use in the conveyance of harmful acids, gases, alkalis and the like, the valve being constructed in such a manner whereby all of the parts thereof may be replaced as desired with the greatest of ease.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an end elevational view of the valve member and shows the general external details thereof;

Figure 4 is an enlarged exploded perspective view of the main components of the valve which is the subject of this invention.

Figure 2:
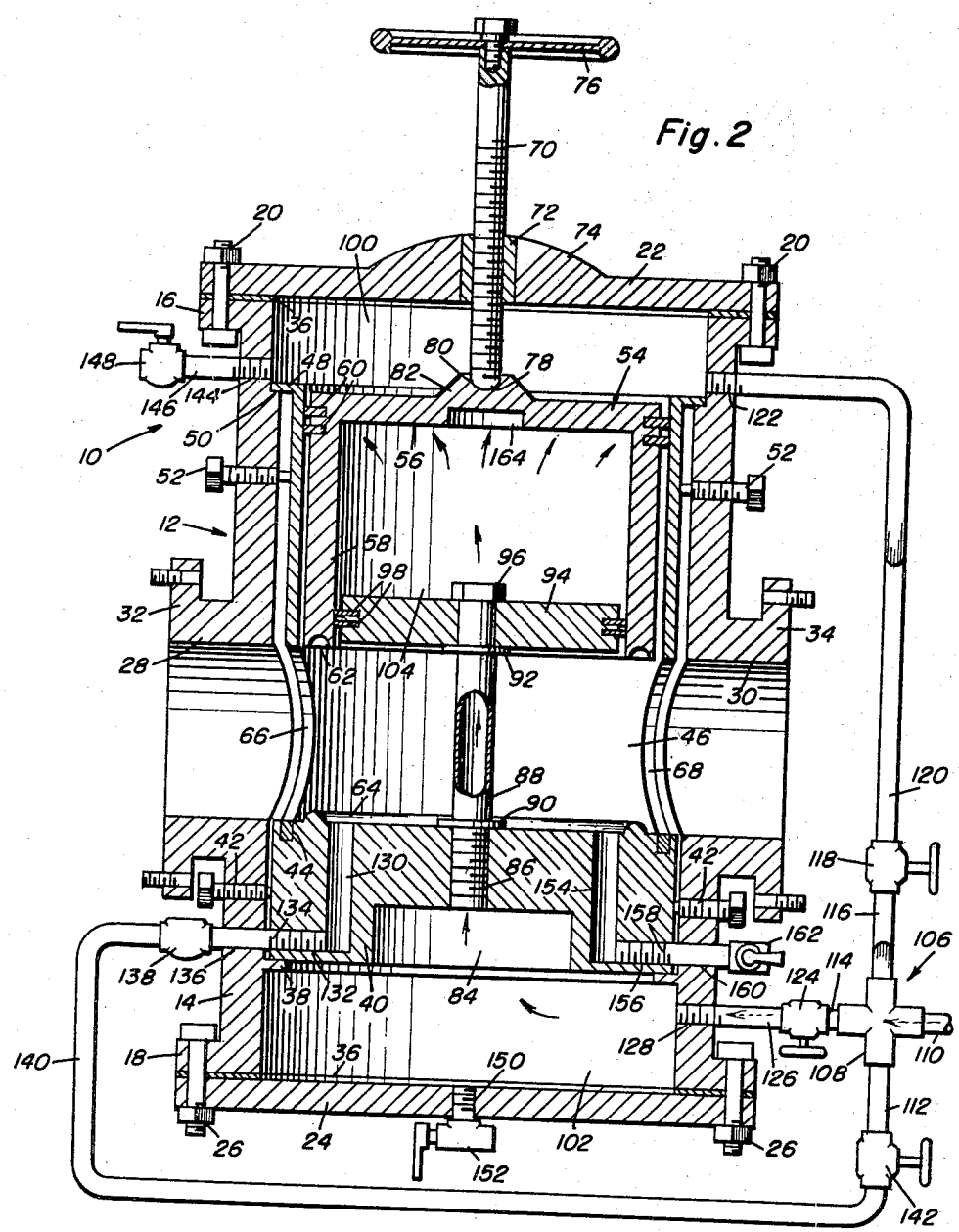
Figure 2 is an enlarged vertical sectional view taken substantially upon the plane indicated by the section line 2—2 of Figure 1 and shows the specific details of the valve, the valve member thereof being shown in an open position, a portion of a support of the valve construction being broken away and shown in section for purposes of clarity.

Referring now to the drawings in detail, it will be seen that there is illustrated in Figure 1 the valve construction which is the subject of this invention, the valve being referred to in general by the reference numeral 10. The valve 10 includes a valve housing which is referred to in general by the reference numeral 12. The valve housing 12 includes a cylindrical body portion 14 which is provided at the upper end thereof with a flange 16 and at the lower end thereof with a flange 18. Closing the upper end of the valve body 14 and secured to the flange 16 by a plurality of removable fasteners 20 is a top wall 22. Secured to the flange 18 and closing the lower end of the valve body 14 is a bottom wall 24. The bottom wall 24 is removably secured to the flange 18 by fasteners 26.

In order that fluid lines may be connected to the valve housing 12, the valve body 14 is provided with diametrically opposed pipe sections 28 and 30 which terminate in flanges 32 and 34. The flanges 32 and 34 are utilized for connecting the valve 10 to piping (not shown). It is to be understood that the flanges 32 and 34 will abut against similar flanges and be sealed with respect thereto by gaskets, such as the gaskets 36 between the components of the valve housing 12.

Figure 3:
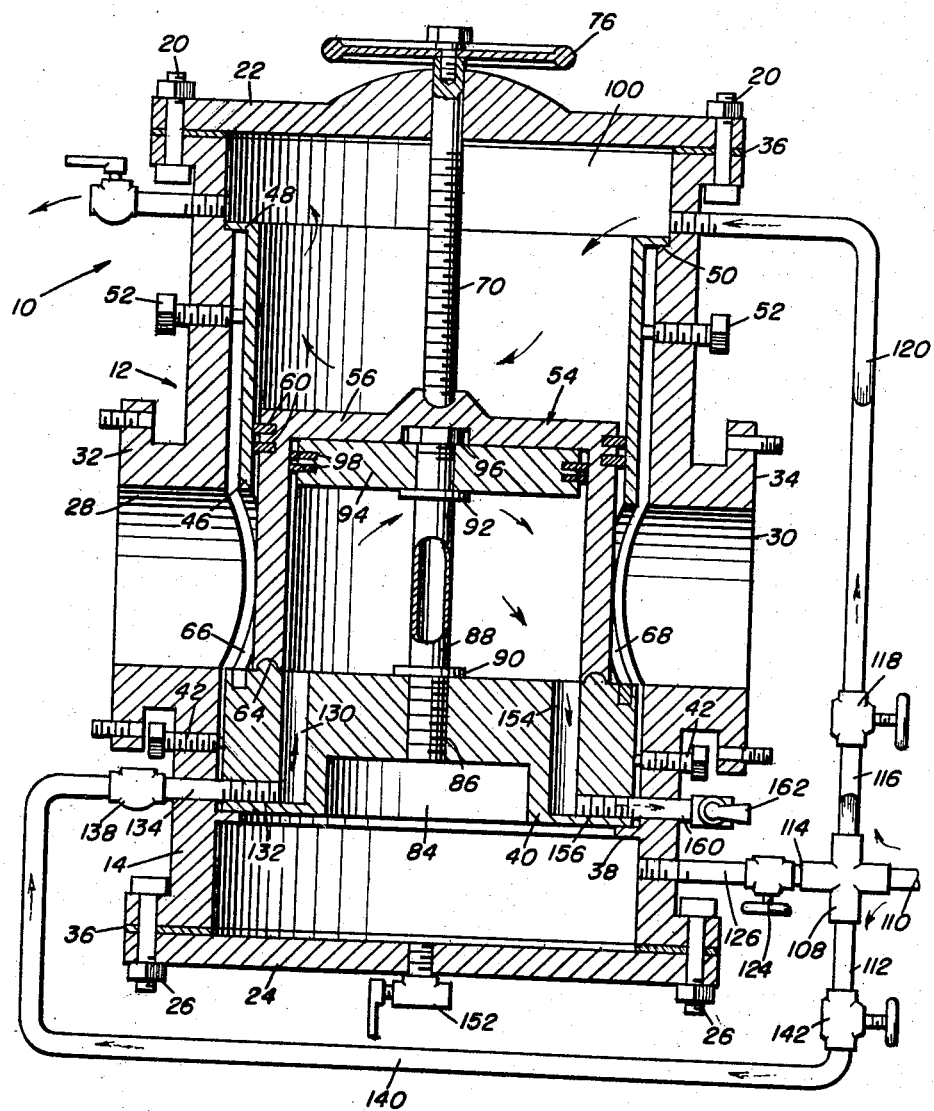
Figure 3 is an enlarged vertical sectional view similar to Figure 2 and shows the valve member thereof moved to a closed position and clamped in such position, there also being illustrated the flow of cleansing fluid through the valve.

Referring now to Figures 2 and 3 in particular, it will be seen that there is formed in the valve body 14 adjacent the flange 18 thereof an inwardly projecting annular seat 38. Resting upon the seat 38 is a partition wall 40. The partition wall 40 is of a generally circular cross-section and is generally solid in formation. The partition wall 40 is sealed with respect to the lower portion of the valve body 14 by the engagement thereof with the seat 38. It is secured in place in the valve body 14 by adjusting and positioning screws 42 which are adjustably carried by the valve body above the seat 38. The upper surface of the partition wall 40 is disposed substantially in alignment with the lower extremities of the interiors of the pipe sections 28 and 30.

Formed in the upper part of the partition wall 40 and opening into the upper surface thereof is an annular recess 44. Seated in the annular recess 44 is a cylinder forming sleeve 46. The sleeve 46 terminates at the upper end thereof in an outwardly directed annular flange 48. The flange 48 rests upon and is sealed with respect to an annular seat 50 formed in the interior of the valve body 14 by increasing the internal diameter of the extreme upper part thereof. The cylinder forming sleeve 46 is removable from the valve housing 12 and is retained within the valve body 14 by suitable adjusting screws 52. The sleeve 46 is also removable with respect to the partition wall 40.

Slidably disposed within the cylinder forming sleeve 46 is an inverted cup-shaped valve member which is referred to in general by the reference numeral 54. The valve member 54 includes a top wall 56 and a depending skirt portion 58. Carried by the extreme upper part of the skirt portion 58 is a pair of rings 60 which engage the inner surface of the sleeve 46 and form a seal with respect thereto. There is formed in the bottom edge of the skirt portion 58 a semicircular cross-sectional annular recess 62. Projecting upwardly from the upper surface of the partition wall 40 is a semicircular cross-sectional valve seat 64 which is annular in outline and which is positioned and configurated to be tightly received within the recess 62 to form a tight seal between the valve member 54 and the partition wall 40. Thus, it will be readily apparent that the valve member 54 may be utilized to close oppositely disposed opening 66 and 68 formed in the sleeve 46 and aligned with the pipe sections 28 and 30 to permit the flow of fluids through the valve 10.

In order that the valve member 54 may be clamped in a closed position, there is provided a clamping screw 70. The clamping screw 70 is clampingly engaged in a threaded sleeve 72 carried by an enlarged central boss 74 of the top wall 22. The adjusting screw 70 is provided with a suitable hand wheel 76 to facilitate the turning thereof. The lower end of the clamping screw 70 is rounded as at 78 to fit within a seat 80 formed in an upwardly projecting boss 82 formed as part of the top wall 56 of the valve member 54.

Formed in the underside of the partition wall 40 is an enlarged opening 84. The opening 84 has communicated therewith an internally threaded bore 86 which opens to the upper side of the partition wall 40. Threadedly engaged in the bore 86 and removable therefrom is a tubular support 88. The support 88 carries a collar 90 to limit the threading thereof into the bore 86.

The support 88 is provided adjacent the upper end thereof with a collar 92. Positioned over the upper end of the support 88 is a flat piston 94 which seats upon the collar 92. The piston 94 is retained on the support 88 by a removable nut 96 threadedly engaged on the extreme upper end of the support 88. The piston 94 is retained stationary by the support 88 and is provided in the peripheral edge thereof with rings 98 which engage the interior of the skirt portion 58 and forms a seal with the same.

From the foregoing description of the valve 10, it will be seen that there are formed in the interior thereof three separate and distinct chambers. The first chamber, which will be referred to by the reference numeral 100, is disposed in the extreme upper part of the valve body 14 between the top wall 22 and the top wall 56 of the valve member 54. A second chamber, which will be referred to by the reference numeral 102, is formed in the bottom part of the valve body 14 and is disposed between the bottom wall 24 and the partition wall 40. The third chamber, which is referred to by the reference numeral 104, is formed within the valve member 54 and is closed by the piston 94.

In order to effect the cleaning and operation of the valve 10, there is provided a fluid pressure system which is referred to in general by the reference numeral 106. The fluid pressure system 106 includes a cruciform fitting 108 which has connected thereto a fluid line 110 which is, in turn, connected to a pressurized fluid source (not shown). Connected to the other legs of the cruciform fitting 108 are pipes 112, 114 and 116.

Connected to the pipe 116 is a valve 118. Connected to the opposite end of the valve 118 is a pipe 120 which has its opposite end threadedly engaged in a bore 122 formed in the upper part of the valve body 14 and communicated with the chamber 100.

Connected to the opposite end of the pipe 114 is a valve 124. Connected to the opposite end of the valve 124 is a pipe 126 whose opposite end is threadedly engaged in a bore 128. The bore 128 is formed in the lower part of the valve body 14 and is communicated with the second chamber 102.

Formed in the partition wall 40 is an L-shaped inlet fluid passage which includes a vertical portion 130 opening through the upper surface of the partition wall 40 and an internally threaded lower portion 132 which opens through the peripheral wall of the partition wall 40. Threadedly engaged in the lower portion 132 is one end of a pipe 134. The pipe 134 tightly passes through an opening 136 formed in the valve body 14 in alignment with the lower portion 132 of the L-shaped fluid passage. Secured to the opposite end of the pipe 134 is a check valve 138. Connected to the check valve 138 is a pipe 140 which has connected to the opposite end thereof a valve 142. The valve 142 is connected to the pipe 112.

In order that the fluid pressure within the first chamber 100 may be relieved, there is formed in the upper part of the valve body 14 in communication with the first chamber 100 a threaded bore 144 in which there is positioned one end of a pipe 146. Carried by the other end of the pipe 146 is a drain cock 148.

The bottom wall 24 is provided with a central threaded bore 150 which communicates the second chamber 102 with the exterior of the valve housing 12. Removably threaded in the bore 150 is a drain cock 152.

A second L-shaped fluid passage is formed in the partition wall 40 in diametrically opposite relation from the first mentioned L-shaped fluid passage. This second fluid passage is an outlet fluid passage and includes a vertical portion 154 which opens through the top surface of the partition wall 40. Communicated with the lower end of the vertical portion 154 is an internally threaded lower portion 156. Threaded in the lower portion 156 is one end of a pipe 158 which tightly passes through an opening 160 formed in the valve body 14. Carried by the opposite end of the pipe 160 is a drain cock 162.

Referring now to Figure 2 in particular, it will be seen that the valve member 54 is in its uppermost position thereby permitting the free flow of fluid through the valve 10. The valve member 54 is moved to this position by opening the valve 124 which permits fluid pressure to be built up in the second chamber 102. This fluid pressure passes upwardly into the third chamber 104 through the standard 88. The pressure built up within the third chamber 104 forces the valve member 54 upwardly and the upper movement of the valve member 54 is controlled by the clamp screw 70.

When it is desired to close the valve 10, the valve member 54 is moved downwardly by opening the drain cock 152 after the valve 124 has been closed. This permits the release of the fluid pressure within the second chamber 102 and the third chamber 104. The valve member 118 is then opened in order that fluid pressure may be introduced into the first chamber 100, thereby forcing the valve member 54 downwardly. After the valve member 54 has seated on the partition wall 40, it is clamped in seating engagement with the valve seat 64 by means of the clamp screw 70. A recess 164 is formed in the bottom side of the top wall 56 of the valve member 54 to provide clearance for the nut 96.

Referring now to Figure 3 in particular, it will be seen that by simultaneously opening the valves 118 and 142 and the drain cocks 148 and 162, the working parts of the valve 10 may be flushed while the valve member 54 is in a closed position to effectively clean all of the working parts of the valve 10.

From the foregoing description of the components of the valve 10, it will be readily apparent that all worn or damaged parts thereof may be individually removed and replaced, thereby greatly reducing the operating cost of the valve 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and changes may be resorted to, falling within the scope of the invention as claimed.

What is claimed as new is as follows:

1. A valve comprising a valve housing, a first chamber and a second chamber in said valve housing, said first and second chambers being disposed in spaced relation at opposite ends of said valve housing, a valve member slidably mounted in said valve housing, said valve member being cup-shaped in configuration and forming a third chamber, a partition wall disposed within said valve housing between said valve member and said second chamber and forming a boundary of said second chamber, said valve member being disposed intermediate said first chamber and said partition wall and including an end wall forming a boundary of said first chamber, a fixed piston disposed within said valve member and forming a wall of said third chamber, said fixed piston being spaced from and supported by said partition wall and together with said valve member and said partition wall defining a flow passage through said housing, said flow passage being sealed relative to said first, second and third chambers, a pressure fluid source, and means including other fluid passages formed in said valve housing for selectively communicating said first, second and third chambers with said pressure fluid source whereby said valve member may be selectively shifted and cleansed, said valve member being slidable into engagement with said partition wall to close said flow passage.

2. A valve comprising a valve housing, a first chamber and a second chamber in said valve housing, said first and second chambers being disposed in spaced relation at opposite ends of said valve housing, a valve member slidably mounted in said valve housing, said valve member being cup-shaped in configuration and forming a third chamber, a partition wall disposed within said valve housing between said valve member and said second chamber and forming a boundary of said second chamber, said valve member being disposed intermediate said first chamber and said partition wall and including an end wall forming a boundary of said first chamber, a fixed piston disposed within said valve member and forming a wall of said third chamber, said fixed piston being spaced from and supported by said partition wall and together with said valve member and said partition wall defining a flow passage through said housing, said flow passage being sealed relative to said first, second and third chambers, a pressure fluid source, and means including other fluid passages formed in said valve housing for selectively communicating said first, second and third chambers with said pressure fluid source whereby said valve member may be selectively shifted and cleansed, said valve member being slidable into engagement with said partition wall to close said flow passage, said valve housing having exhaust means communicated with said first, second and third chambers for selectively exhausting fluid from said first, second and third chambers.

3. A valve comprising a valve housing, a first chamber and a second chamber in said valve housing, said first and second chambers being disposed in spaced relation at opposite ends of said valve housing, a valve member slidably mounted in said valve housing, said valve member being cup-shaped in configuration and forming a third chamber, a partition wall disposed within said valve housing between said valve member and said second chamber and forming a boundary of said second chamber, said valve member being disposed intermediate said first chamber and said partition wall and including an end wall forming a boundary of said first chamber, a fixed piston disposed within said valve member and forming a wall of said third chamber, said fixed piston being spaced from and supported by said partition wall and together with said valve member and said partition wall defining a flow passage through said housing, said flow passage being sealed relative to said first, second and third chambers, a pressure fluid source, and means including other fluid passages formed in said valve housing for selectively communicating said first, second and third chambers with said pressure fluid source whereby said valve member may be selectively shifted and cleansed, said valve member being slidable into engagement with said partition wall to close said flow passage, said valve housing having exhaust means communicated with said first, second and third chambers for selectively exhausting fluid from said first, second and third chambers, a manual operator for said valve member carried by said valve housing and engageable with said valve member to lock said valve member in a flow passage closing position.

4. A valve comprising a valve housing, a first chamber and a second chamber in said valve housing, said first and second chambers being disposed in spaced relation at opposite ends of said valve housing, a valve member slidably mounted in said valve housing, said valve member being cup-shaped in configuration and forming a third chamber, a partition wall disposed within said valve housing between said valve member and said second chamber and forming a boundary of said second chamber, said valve member being disposed intermediate said first chamber and said partition wall and including an end wall forming a boundary of said first chamber, a fixed piston disposed within said valve member and forming a wall of said third chamber, said fixed piston being spaced from and supported by said partition wall and together with said valve member and said partition wall defining a flow passage through said housing, said flow passage being sealed relative to said first, second and third chambers, a pressure fluid source, and means including other fluid passages formed in said valve housing for selectively communicating said first, second and third chambers with said pressure fluid source whereby said valve member may be selectively shifted and cleansed, said valve member being slidable into engagement with said partition wall to close said flow passage, and a cylinder forming sleeve, said sleeve being supported by said partition wall, said valve member being mounted within said sleeve.

5. A valve comprising a valve housing, a first chamber and a second chamber in said valve housing, said first and second chambers being disposed in spaced relation at opposite ends of said valve housing, a valve member slidably mounted in said valve housing, said valve member being cup-shaped in configuration and forming a third chamber, a partition wall disposed within said valve housing between said valve member and said second chamber and forming a boundary of said second chamber, said valve member being disposed intermediate said first chamber and said partition wall and including an end wall forming a boundary of said first chamber, a fixed piston disposed within said valve member and forming a wall of said third chamber, said fixed piston being spaced from and supported by said partition wall and together with said valve member and said partition wall defining a flow passage through said housing, said flow passage being sealed relative to said first, second and third chambers, a pressure fluid source, and means including other fluid passages formed in said valve housing for selectively communicating said first, second and third chambers with said pressure fluid source whereby said valve member may be selectively shifted and cleansed, said valve member being slidable into engagement with said partition wall to close said flow passage, and a cylinder forming sleeve, said sleeve being supported by said partition wall, said valve member being mounted within said sleeve, and said partition wall being removable from said valve housing.

6. A valve comprising a valve housing, a first chamber and a second chamber in said valve housing, said first and second chambers being disposed in spaced relation at opposite ends of said valve housing, a valve member slidably mounted in said valve housing, said valve member being cup-shaped in configuration and forming a third chamber, a partition wall disposed within said valve housing between said valve member and said second chamber and forming a boundary of said second chamber, said valve member being disposed intermediate said first chamber and said partition wall and including an end wall forming a boundary of said first chamber, a fixed piston disposed within said valve member and forming a wall of said third chamber, said fixed piston being spaced from and supported by said partition wall and together with said valve member and said partition wall defining a flow passage through said housing, said flow passage being sealed relative to said first, second and third chambers, a pressure fluid source, and means including other fluid passages formed in said valve housing for selectively communicating said first, second and third chambers with said pressure fluid source whereby said valve member may be selectively shifted and cleansed, said valve member being slidable into engagement with said partition wall to close said flow passage, a piston support extending between said piston and said partition wall, said piston support being tubular and defining that one of said fluid passages which selectively communicates fluid to said third chamber.

References Cited in the file of this patent

UNITED STATES PATENTS

| | | | |
|---|---|---|---|
| 770,866 | Mullin | Sept. 27, | 1904 |
| 967,702 | Anderson | Aug. 16, | 1910 |
| 1,111,244 | Wilson | Sept. 22, | 1914 |
| 1,575,693 | Kromer | Mar. 9, | 1926 |
| 2,254,472 | Dahl | Sept. 2, | 1941 |
| 2,305,724 | Luetzelschwab | Dec. 22, | 1942 |
| 2,361,225 | Meyer | Oct. 24, | 1944 |